Sept. 4, 1962            H. JOWITT            3,052,713

CATALYSED GAS-LIQUID CHEMICAL PROCESSES

Filed Feb. 24, 1959

INVENTOR:
Hubert JOWITT
By Wenderoth, Lind & Ponack
Attys

United States Patent Office 3,052,713
Patented Sept. 4, 1962

3,052,713
CATALYSED GAS-LIQUID CHEMICAL PROCESSES
Hubert Jowitt, Hull, England, assignor to The Distillers Company Limited, Edinburgh, Scotland, a British company
Filed Feb. 24, 1959, Ser. No. 795,262
Claims priority, application Great Britain Mar. 5, 1958
10 Claims. (Cl. 260—484)

The present invention relates to catalysed chemical processes in which a liquid is reacted with a gas or vapour and in which the rate of reaction is dependent on the concentration of catalyst used.

Many catalysed reactions of this type are known. It is frequently found that while a good yield of the desired product can be obtained, the optimal catalyst concentration required is so great as to make commercial working of the reaction impracticable; if, however, a sub-optimal concentration of catalyst is used, commercial working of the reaction is again impracticable, because poor yields of the desired product are obtained. Furthermore, in some catalysed reactions of this type, it is desirable to ensure that substantially complete conversion of the gaseous or vapour-phase reactant takes place, without having to use an excessively large contact area between the reactants.

The reaction between ketene and a dialkoxymethane to produce an alkyl 3-alkoxypropionate, for instance, can be catalysed by boron trifluoride, which may conveniently be used in the form of its diethyl ether complex, $BF_3 \cdot C_2H_5OC_2H_5$. The rate of reaction is dependent on the catalyst concentration. When, for example, ketene is passed up a vertical, jacketed, packed column into the top of which a stream of diethoxymethane containing the catalyst is fed, it is economically undesirable to use more than about 2% by weight of the catalyst in the column; a high yield of the desired product, ethyl 3-ethoxypropionate, may be obtained based on the ketene absorbed, but, using a column of convenient size, only a minor proportion of the ketene fed to the column is absorbed, the remainder passing out of the column in the effluent gas stream, from which it can be recovered and recycled to the column only with great difficulty. The ketene absorption could, in theory, be increased by using a greater catalyst concentration but this would make commercial working of the process uneconomic.

It is an object of the invention to provide a commercially practicable process of carrying out a reaction of this type whereby a high conversion of the gaseous reactant is achieved.

Accordingly, the present invention is a process of reacting a liquid reactant with a gaseous reactant in the presence of a catalyst to produce a desired product, the rate of reaction being dependent on the concentration of catalyst present, which comprises passing the gaseous reactant through a series of two zones, mixing a portion of the liquid reactant with gaseous reactant in a first zone containing insufficient catalyst to convert substantially all the gaseous reactant present in the first zone to the desired product, passing the resulting gaseous material from the first zone and mixing it with another portion of the liquid reactant in a second zone containing sufficient catalyst to convert substantially all the gaseous reactant present in the second zone to the desired product, and recovering the desired product.

By the words "gaseous reactant" in this specification is meant a gas or a vapour; similarly the "gaseous material" passed from the first zone, as described in the previous paragraph, may be a gas, a vapour or a gas-vapour mixture.

The series of two zones through which the gaseous reactant passes may take any suitable form; it may, for example, be two zones of a packed column or a series of separate pot reactors, or separate groups of pot reactors, arranged in cascade form. The two zones may be adjacent or separate. The two zones may be maintained at the same temperature or at different temperatures; in one embodiment of the invention, the second zone is maintained at a lower temperature than is the first zone.

The catalyst may be placed in the zones before the gaseous reactant or the liquid reactant is passed through. The catalyst may also be introduced into the zones in admixture with the liquid reactant, so that portions of the liquid reactant containing a different concentration of catalyst are introduced into either of the zones. The concentration of catalyst in the first zone is such that it is insufficient to convert substantially all the gaseous reactant present in the first zone to the desired product. The concentration of catalyst in the portion of the liquid reactant fed to the second zone is such that the catalyst present in that zone is in at least a concentration sufficient to convert substantially all the gaseous reactant present in the second zone to the desired product. The catalyst may also be introduced into the zones, for example, when the second zone is situated above the first zone, by feeding into the second zone a mixture of the liquid reactant and catalyst and by feeding into the first zone liquid reactant without catalyst, the concentration of catalyst in the feed to the second zone being such that, when the catalyst has become distributed between the two zones and diluted in the first zone, the first zone contains insufficient catalyst to convert substantially all the gaseous reactant present to the desired product while the second zone contains sufficient catalyst to convert substantially all the gaseous reactant present to the desired product.

The desired product may be recovered in any suitable way. The effluent from the first zone may, for instance, be collected and unwanted by-products removed from it. The product may then be further purified if necessary.

Presently preferred illustrative embodiments of the invention are shown diagrammatically in the acccompanying drawing, wherein.

Figure 1:
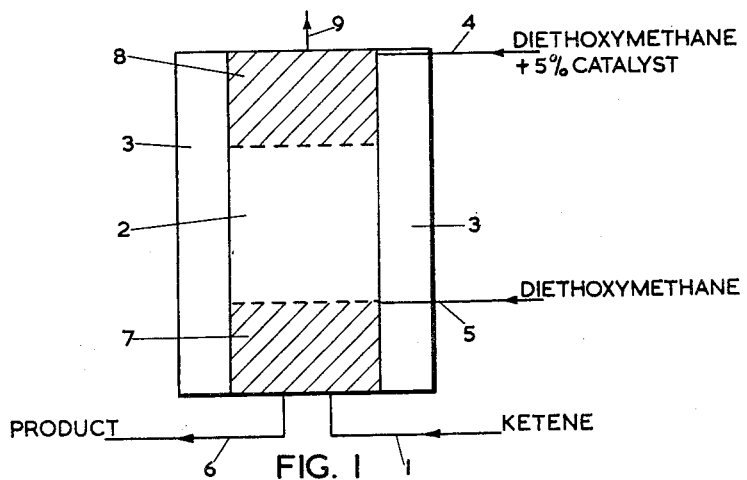
FIGURE 1 represents one such embodiment of the invention.

In the embodiment of the invention shown in FIGURE 1, ketene vapour is reacted in countercurrent with diethoxymethane, introduced as liquid reactant, to yield ethyl 3-ethoxypropionate as the desired product, a high conversion of the ketene to ethyl 3-ethoxypropionate being achieved. The catalyst is preferably boron trifluoride; the boron trifluoride may be in the form of the diethyl ether complex $BF_3 \cdot C_2H_5OC_2H_5$, but other boron trifluoride complexes or gaseous boron trifluoride may be used.

Ketene vapour is fed by the line 1 into the base of the vertical packed column 2 surrounded by the jacket 3 through which a fluid such as water can be circulated to maintain the temperature of the column 2 at a desired level. The column 2 is provided with inlet lines 4 and 5 and outlet lines 6 and 9. A mixture of diethoxymethane with the catalyst is fed as liquid into the column by the lines 4 and 5, and this mixture flows down the packed column, meeting and mixing with the rising ketene vapour.

In operation, water is circulated through the jacket 3 to maintain the column 2 at a temperature of about 50° C. Ketene is introduced into the base of the column by line 1.

Diethoxymethane containing in solution 5% by weight of the catalyst is fed in at the top of the column 2 by line 4 and diethoxymethane containing no catalyst is fed into the lower part of the column 2 by line 5. The portion of the diethoxymethane fed into the column 2 by the line 4 is about 40% of the total diethoxymethane fed in by the lines 4 and 5 and the overall catalyst usage is therefore 2% based on the diethoxymethane fed. The total amount of diethoxymethane fed is preferably in about 50% molar excess of the amount of ketene passed; lower or higher ratios of ketene to diethoxymethane may be used if desired.

The ketene, on being fed into the column, enters the zone 7 (the "first zone") in which the concentration of the boron trifluoride-diethyl ether complex is 2%. Ethyl 3-ethoxypropionate, produced by the reaction of ketene and diethoxymethane passes in liquid form together with unreacted diethoxymethane down column 2 and may be removed from the base of the column by line 6. The ethyl 3-ethoxypropionate produced is substantially free from ketene.

Unreacted ketene from the zone 7 passes up the column 2 and enters the zone 8 (the "second zone") in which the concentration of catalyst is 5% and is sufficient to convert completely the ketene passing into the zone.

If, in contrast to this embodiment of the present invention, all the diethoxymethane used in the process is fed into the column 2 by the line 4, that is at the head of the column, the line 5 being closed, by feeding in the ketene by the line 1 and maintaining the column temperature at 50° C., as in the embodiment of the invention described in the previous paragraph, it is found that when a 2% catalyst concentration in the column is employed, by feeding in diethoxymethane containing 2% by weight of the boron trifluoride-diethyl ether complex catalyst, the other conditions being the same, only about 40% of the ketene fed into the column is consumed; the unreacted ketene, which passes out of the column 2 by the line 9, can be recovered for recycling to the column only with great difficulty. It is found that it is necessary to have a catalyst concentration in the column of at least about 5% to ensure that all the ketene fed into the column is consumed, and this proportion of catalyst renders the process economically impracticable.

Figure 2:
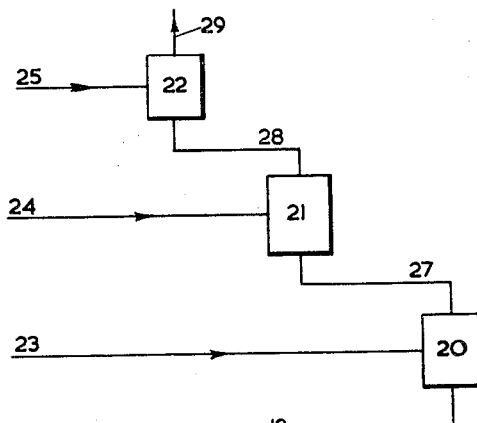
FIGURE 2 represents an alternative embodiment.

In a further embodiment of the invention, illustrated by FIGURE 2 of the drawings accompanying this specification, ketene and diethoxymethane are reacted in the presence of boron trifluoride-diethyl ether complex as catalyst to produce ethyl-3-ethoxypropionate, the process being carried out in a series of pot-reactors arranged in a cascade series.

Ketene vapour is fed by line 10 into the reactor 11, which is the first of a group of reactors 11, 12 and 13 arranged in a cascade series. Diethoxymethane is fed into the reactors 11, 12 and 13 by lines 14, 15 and 16 respectively. The average catalyst concentration in the group of reactors 11, 12 and 13 is arranged to be insufficient to convert all the ketene passing through the group of reactors to the desired product. Unreacted ketene from reactor 11, is passed to the next reactor 12 by line 17; unreacted ketene from reactor 12 is passed to the next reactor 13 by line 18, and unreacted ketene from reactor 13 is passed through line 19 to the reactor 20, which is the first of a group of reactors 20, 21 and 22 arranged in a cascade series connected by lines 27 and 28. A mixture of ethyl-3-ethoxypropionate, diethoxymethane and catalyst from reactor 13 passes as liquid through line 18 to reactor 12, and then, from reactor 12, passes as liquid through line 17 to reactor 11, from which liquid may be removed by the line 26. Diethoxymethane and catalyst are fed as a mixture into the reactors 20, 21 and 22 by lines 23, 24 and 25 respectively. The concentration of catalyst in the diethoxymethane fed, which may be the same or different, is arranged so that the average catalyst concentration in the group of reactors 20, 21 and 22 is sufficient to convert all the ketene passing through the group of reactors to the desired product. The reactor 22 has an outlet line 29. The ethyl 3-ethoxypropionate produced in reactors 20, 21 and 22 passes together with the catalyst and unreacted diethoxymethane, as liquid through the series of reactors 11, 12 and 13 and ethyl 3-ethoxypropionate may then be removed as liquid from reactor 11 by line 26. Using any suitable known method, the boron trifluoride catalyst may be recovered from the reaction product leaving reactor 11 by line 26. If desired, any excess of diethoxymethane may readily be separated from the ethyl 3-ethoxypropionate and recycled to the reactors.

The group of reactors 11, 12 and 13 thus forms the "first zone" and the group of reactors 20, 21 and 22 forms the "second zone," these zones being characterising features of the present invention.

The temperature of each of the reactors 11, 12, 13, 20, 21 and 22 may be the same or different; conveniently, the average temperature of the reactors 20, 21 and 22 is below the average temperature of the reactors 11, 12 and 13.

The following examples illustrate embodiments of the present invention.

*Example 1*

Ketene at the rate of 19,000 parts by volume per hour was passed into a first reactor, having a working capacity of 1,000 parts by volume and containing a stirred mixture maintained at 60° C. and consisting of diethoxymethane, boron trifluoride-diethyl ether complex as catalyst and the product of the reaction of ketene and diethoxymethane. The gas leaving this reactor was passed into a second reactor, maintained at 15° C. and having a working capacity of 100 parts by volume. The gas leaving the second reactor was analysed for ketene.

Diethoxymethane containing 10% by weight of boron trifluoride-diethyl ether complex was fed continuously into the second reactor. The overflow from the second reactor was diluted with a further quantity of diethoxymethane so that the concentration of the boron trifluoride-diethyl ether complex was decreased to 0.8% by weight; this mixture was fed continuously into the first reactor, the average catalyst concentration was therefore 0.8% by weight of the diethoxymethane fed. The overflow from the first reactor was neutralised with ammonia and the ethyl 3-ethoxypropionate was recovered from the excess of diethoxymethane.

When the conditions in the two reactors had become steady, the conversion of diethoxymethane was 57.6% and the yield of ethyl 3-ethoxypropionate was 85.7% based on the diethoxymethane consumed. Of the ketene feed only 0.5% by volume remained in the gas leaving the second reactor and the yield of ethyl 3-ethoxypropionate was 86.3% based on the ketene feed.

*Example 2*

Ketene gas was passed for 4.25 hours at 19,500 parts by volume per hour into a first reactor, having a working capacity of 136 parts by volume, maintained at 45° to 50° C. and containing a stirred equilibrium reaction mixture of diethoxymethane, boron trifluoride-diethyl ether complex as catalyst and the product of the reaction of ketene and diethoxymethane. The gas leaving this reactor was passed into a second reactor, maintained at 11.5° to 14.5° C. and having a working capacity of 100 parts by volume. The gaseous material leaving the second reactor was analysed for ketene.

Diethoxymethane containing 5% by weight of boron trifluoride-diethyl ether complex was fed continuously into the second reactor at 60 parts by volume per hour. The overflow from the second reactor was diluted with a further quantity of diethoxymethane so that the concentration of the boron trifluoride-diethyl ether complex was decreased to 2% by weight; this mixture was fed continuously into the first reactor. The average catalyst concentration was therefore 2% by weight of the diethoxymethane fed. The overflow from the first reactor was neutralised with ammonia and the ethyl 3-ethoxypropionate was recovered from the excess of diethoxymethane.

The conversion of the diethoxymethane to ethyl 3-ethoxypropionate was 50%, the yield of ethyl 3-ethoxypropionate being 86% based on the ketene fed and 87% based on the diethoxymethane consumed. 98% of the ketene fed was absorbed.

Similar results are achieved if the ketene is reacted, in accordance with the invention, with dialkoxymethanes other than diethoxymethane; the alkyl groups of the dialkoxymethane may be, for instance, methyl, propyl or butyl groups.

I claim:

1. In a process of reacting a liquid lower dialkoxymethane with ketene in the presence of a boron trifluoride catalyst the predetermined concentration of which corresponds to maximum yield of lower alkyl-3-lower alkoxy-propionate, the improvement consisting of mixing a portion of the dialkoxymethane with ketene in a first zone containing said catalyst in a concentration below the aforesaid predetermined concentration, withdrawing the resultant gaseous material containing unreacted ketene from said first zone, and mixing said gaseous material with another portion of said dialkoxymethane in a second zone containing said catalyst in said predetermined concentration.

2. The process claimed in claim 1 wherein the catalyst is boron trifluoride.

3. The process claimed in claim 1 wherein the second zone is maintained at a lower temperature than is the first zone.

4. The improvement as claimed in claim 1, wherein said borontrifluoride catalyst is selected from the group consisting of boron trifluoride and the diethylether complex of boron trifluoride.

5. In a process of reacting diethoxymethane with ketene in the presence of boron trifluoride catalyst the concentration of which corresponds to maximum yield of ethyl-3-ethoxypropionate, the improvement consisting of mixing a portion of diethoxymethane with ketene in a first zone containing said catalyst in a concentration below the aforesaid predetermined concentration, withdrawing the resultant gaseous material containing unreacted ketene from said first zone, and mixing said gaseous material with another portion of diethoxymethane in a second zone containing said catalyst in said predetermined concentration.

6. The combination of process steps as claimed in claim 5, wherein said catalyst is borontrifluoride, and wherein said predetermined concentration of the catalyst is 5%, by weight, based on the amount of dioxymethane.

7. The combination of process steps as claimed in claim 6, wherein the catalyst concentration is said first zone is 2% by weight, based on the amount of dioxymethane.

8. The combination of process steps as claimed in claim 6, wherein the first zone is maintained at an average temperature of about 60° C. and the second zone is maintained at an average temperature of about 15° C.

9. The combination of process steps as claimed in claim 5, wherein said catalyst is borontrifluoride, and wherein said predetermined concentration of the catalyst is from about 5 to 10% by weight, based on the amount of dioxymethane.

10. The combination of process steps as claimed in claim 9, wherein the catalyst concentration in said first zone is from about 0.8 to 2% by weight, based on the amount of dioxymethane.

References Cited in the file of this patent

UNITED STATES PATENTS

| | | |
|---|---|---|
| 2,039,344 | Putnam et al. | May 5, 1936 |
| 2,436,286 | Brooks | Feb. 17, 1948 |
| 2,449,447 | Brooks | Sept. 14, 1948 |
| 2,838,561 | Fisher et al. | June 10, 1958 |